United States Patent
Hsia

(10) Patent No.: US 9,854,640 B2
(45) Date of Patent: Dec. 26, 2017

(54) SOLID-STATE LIGHTING CONTROL WITH DIMMABILITY AND COLOR TEMPERATURE TUNABILITY USING LOW VOLTAGE CONTROLLER

(71) Applicant: Aleddra Inc., Renton, WA (US)

(72) Inventor: Chungho Hsia, Bellevue, WA (US)

(73) Assignee: ALEDDRA INC., Renton, WA (US)

( * ) Notice: Subject to any disclaimer, the term of this patent is extended or adjusted under 35 U.S.C. 154(b) by 103 days.

(21) Appl. No.: 14/930,356

(22) Filed: Nov. 2, 2015

(65) Prior Publication Data
US 2017/0127485 A1     May 4, 2017

(51) Int. Cl.
H05B 33/08         (2006.01)
(52) U.S. Cl.
CPC ....... H05B 33/0896 (2013.01); H05B 33/086 (2013.01); H05B 33/0827 (2013.01)
(58) Field of Classification Search
CPC ............ H05B 33/0815; H05B 33/0845; H05B 33/086; H05B 33/0896; H05B 37/0272
USPC ........................................................ 315/201
See application file for complete search history.

(56) References Cited

U.S. PATENT DOCUMENTS

| | | | | |
|---|---|---|---|---|
| 8,319,452 B1* | 11/2012 | Hamel | ............... | H05B 37/0254 315/291 |
| 9,131,581 B1* | 9/2015 | Hsia | ..................... | H05B 33/086 |
| 2008/0224633 A1* | 9/2008 | Melanson | .......... | H05B 33/0809 315/292 |
| 2008/0231214 A1* | 9/2008 | Kim | ...................... | A61N 5/0618 315/360 |
| 2010/0026208 A1* | 2/2010 | Shteynberg | ........ | H05B 33/0815 315/297 |
| 2010/0096993 A1* | 4/2010 | Ashdown | ............... | F21V 29/004 315/113 |
| 2012/0001555 A1* | 1/2012 | Tu | ......................... | F21V 7/0008 315/161 |
| 2012/0299511 A1* | 11/2012 | Montante | ........... | H05B 33/0851 315/297 |
| 2015/0208469 A1* | 7/2015 | Coetzee | ................... | H02M 1/36 315/307 |
| 2015/0312990 A1* | 10/2015 | van de Ven | ........ | H05B 33/0857 315/186 |
| 2016/0174316 A1* | 6/2016 | Hori | ................... | H05B 33/0866 315/186 |

* cited by examiner

*Primary Examiner* — Don Le
*Assistant Examiner* — Jonathan G Cooper
(74) *Attorney, Agent, or Firm* — Han IP Corporation

(57) ABSTRACT

A dimming and correlated color temperature (CCT) tuning lighting system comprises a controller and multiple light-emitting diode (LED)-based lighting devices. Each lighting device comprises a control circuit, at least two LED driving circuits, and at least two types of LED-based light sources. When the controller receives low voltage dimming and CCT tuning signals from its inputs, it generates pulse-width modulated (PWM) dimming and CCT tuning signals delivered to the control circuit and at least two LED driving circuits in each of the multiple lighting devices, which then individually power the at least two types of LED-based light sources to emit a light with a lighting level and a CCT. The controller may be integrated in each of the multiple lighting devices to further simplify system design, ultimately achieving the lowest cost.

30 Claims, 6 Drawing Sheets

SOLID-STATE LIGHTING CONTROL WITH DIMMABILITY AND COLOR TEMPERATURE TUNABILITY USING LOW VOLTAGE CONTROLLER

TECHNICAL FIELD

The present disclosure relates to a lighting control of light-emitting diode (LED)-based lighting devices, and more particularly to a system and a method for LED-based lighting devices that require dimmability and correlated color temperature (CCT) tunability using class 2, low voltage controllers.

BACKGROUND

Solid-state lighting from semiconductor LED light sources has received much attention in general lighting applications today. Because of its potential for more energy savings, better environmental protection (with no hazardous materials used), higher efficiency, smaller size, and longer lifetime than conventional incandescent bulbs and fluorescent tubes, the LED-based solid-state lighting will be a mainstream for general lighting in the near future. Meanwhile, as LED technologies develop with the drive for energy efficiency and clean technologies worldwide, more families and organizations will adopt LED-based lighting for their illumination applications. In this trend, more energy saving with a dimming control, more efficient CCT tunability, more environmental protection, and more aesthetic perception in lighting quality have become especially important and need to be well addressed.

The relationship between actual dimming and perceived dimming is not linear but logarithmic by nature because the human eye responds to low light levels by enlarging the pupil, allowing more light to enter the eye. This response results in a difference between measured and perceived light levels. For example, a lamp that is dimmed to 10% of its maximum measured light output is perceived as being dimmed to only 32%. Similarly, a lamp dimmed to 25% is perceived to be at 50%. Taking advantage of such differences, the use of a dimmer on LED-based lamps can save even more energy than actual dimming itself. Besides, reduced electrical consumption can further prolong life expectancy of the LED-based lamps and reduce maintenance or replacement costs.

A conventional wall-mount dimmer uses a leading-edge phase angle, trailing-edge phase angle, or phase cut to control a power delivering to a lighting device. Whereas such a dimmer seems to provide energy efficiency and is driving consumers to replace standard incandescent lamps with LED-based retrofit lamps, consumers often find that the performance they expect is not being achieved, at least when the solid-state lighting (SSL) products are used with existing TRIAC or phase-cut dimmers. Dimmer compatibility with LED-based lighting devices is a main issue. Basically, the wall-mount TRIAC dimmers are not so designed for LED loads that the existing residential wiring infrastructure can limit their capabilities for modern lighting controls. Furthermore, there are no industry standards that specifically guide LED dimming performance, and as such, a number of undesirable results may occur when one uses a dimmable LED-based lamp with an incandescent dimmer, such as reduced dimming range, flickering or strobing of the lamp, and inconsistent performance based on the number and classification of lamps being controlled by one incandescent dimmer. Moreover, a recent IEEE report raised a health concern due to invisible flicker at frequencies below 165 Hz including seizures, headaches, migraines, impaired ocular motor control, and impaired visual performance, etc.

Most of the existing residential and commercial electrical dimming infrastructures are single channel wall dimmers, which are crucial to serve the market with high quality solutions and to solve the various challenges to come. Furthermore, power factor of an electrical appliance refers simply to the degree to which the voltage potential and electric current draw required by the electrical appliance are in-phase for each half-cycle of the sinusoidal AC waveform. In fact, the current waveform should be in phase with AC voltage waveform to have a maximum power delivered to the load resulting in a unity power factor as in a purely resistive circuit. Conventional dimmers themselves have a major effect on power factor for all kinds of loads—capacitive, inductive, non-linear, and even linear and resistive, because such dimmers typically cut voltage phase over the current peak as required by the load, causing imbalance and harmonic distortion on the AC line. Poor power factor is rarely noticed by residential end-users because their utility companies usually pay the price by spending money on hardware and additional power to correct for this imbalance throughout their distribution systems. However, commercial users may either pay additional surcharges for low power factor or improve it at their own cost. For example, if their loads are highly inductive, they may have to install capacitor switch banks to compensate for this power loss.

A conventional driver employed to drive an LED-based lamp basically uses a switch-mode power supply (SMPS) and is considered to be nonlinear with reactive loads, which requires power factor correction (PFC) to reduce non-sinusoidal current distortion and excess energy at harmonics of the line frequency of the voltage. The EU standard EN61000-3-2 regulates harmonic contents and basic PFC criteria for all such switch-mode power supplies. Passive PFC in drivers/power supplies adopted in LED-based lamps usually involve adding capacitors, resistors and steering diodes in a valley-fill circuit. However, the power factor improvement using such a passive PFC circuit is limited. Active PFC involves redistributing the current over the voltage half-cycle waveform. The key is how to improve load regulation without adversely affecting the power factor or to make the load look like a linear resistor. Today, a conventional LED driver employing active PFC typically uses an energy transfer element that includes a flyback transformer to store energy which then directly provides LED current to an LED load. Although simple and low-cost, such a single-stage driver configuration provides so limited functionalities that can barely meet market demands. For example, market needs an external LED driver which can flexibly control one to several LED-based lighting devices in a luminaire. When part of lighting devices are removed from the luminaire for maintenance or replacement, an overall rated current can flow into the remaining LED-based lighting devices, resulting in excessive driving current for LED-based light sources. Market also needs an LED driver which can provide two or three sets of electric current to two or three types of LED-based light sources in order to control CCT of an LED lighting device that comprises such two or three types of LED-based light sources. The conventional LED driver can only provide single channel current control and thus fails to meet these market requirements.

Used as an early fluorescent dimming system and still used today, 0-10 V dimming has been employed to become one of reliable LED dimming control protocols although it is one of the earliest and simplest electronic lighting control signaling systems. A 0-10 V dimmer does not cut AC voltage for introducing phases and thus keep the AC voltage waveform intact. However, to control a dimming level of a lighting device using such a 0-10 V dimmer, one needs to have two extra low-voltage wires separately connected to the lighting device to be dimmed in addition to the power lines from the AC mains. This is so called 4-wire low voltage 0-10 VDC dimming. The low voltage control wires are polarity sensitive, and so accuracy is critical in wiring. This increases the wiring difficulty and installation cost, especially for the existing residential and commercial infrastructures that have two or three power wires in a wall-mount electrical box. However, because 0-10 VDC dimming can provide dimming levels seamlessly from 1% to 100% with continuous dimming voltages from 1 to 10 V, more and more consumers adopt it, taking further advantages such as being less expensive, easily integrating with occupancy sensors, daylight harvesting, DMX, DALI, and wireless 2-channel, and no compatibility issue that has ever been reported to use with LED-based luminaires.

In today's lighting applications, CCT tuning is important. Although consumers demand a CCT tunable lamp that can tune from warm-white at 2,700 K, via sun-white and natural-white at 4,100 K, to cool-white at 6,200±300 K in general lighting to help improve the atmosphere in their working, exhibiting, or living areas, there have been very few such lighting products in luminaire markets. Manufacturers can generally make an LED-based lighting device using two types of phosphor coated white LEDs, one cool white and the other warm white, to mix the light emissions with different ratios to come up with a CCT. By tuning from cool LEDs to warm LEDs, with the intermediate CCTs created by mixing different levels of cool and warm white light, an extent of colors proximate to the black body locus can be obtained. The number of colors used in a CCT tuning system affects color rendering index (CRI), CCT consistency, CCT tuning range, and an efficacy of the system. However, the approach needs a proper LED driver to provide two or more sets of electric current with a proper ratio to the cool white and the warm white LEDs or other types of LEDs such as to emit a light emission with a CCT, a controlled deviation from the blackbody locus (Duv), and CRI. A conventional driver apparently cannot provide various sets drive current to meet such requirements. Furthermore, even if there exists such a driver, an additional CCT tuning signal needs to add to a dimming signal, and ultimately, the two signals from the dimming channel and the CCT tuning channel need to be mixed to generate a completely different format of control signals to control output current from the driver and to power LED-based light sources in multiple lighting devices.

Building Automation Control Network (BACnet) is a data communication object-oriented protocol for building automation and control networks. Its applications include HVAC control, lighting control, access control, security, and fire detection systems. Lighting is typically controlled and monitored via BACnet through manipulation of the object property called present value. Reading the present value will return the on/off status of a switched lighting load or the level of a dimmed lighting load. To control the load it is only necessary to write to the present value of the object representing the lighting load, In BACnet, a dimmer output can be modeled using an Analog Output object with units of 0% to 100% to represent intensity. However, CCT tuning output has not yet been modeled. Once the CCT tuning output, like the dimmer output, is modeled as another Analog Output object, then how a luminaire simultaneously responds to two analog output signals may become challenging. It is therefore the purpose of this patent disclosure to present an approach for controlling dimming level and CCT in a luminaire using two low voltage signals. Not only for BACnet, the approach should also apply to any other protocols adopting low voltage signals. In the context hereafter, the "low voltage" implies a nominal voltage less than or equal to 12 VDC.

SUMMARY

The present disclosure relates to a lighting control of LED-based lighting devices that adopt two low voltage controllers to control dimming level and CCT of multiple LED-based lighting devices that require dimmability and CCT tunability. As mentioned in the description of related art, the cost-effective solution to avoiding a proprietary controller is to adopt two widely used two low voltage controllers originally employed in dimming control, one for dimming input and the other for CCT tuning input. By incorporating dimming and CCT control signals, a dimming and CCT tuning control circuit mixes and converts the two signals into two sets of pulse-width modulation (PWM) signals used to control two sets of current driving two types of LED light sources in a lighting device. In this case, AC voltage in the power line remains intact in all time, thus providing an acceptable power factor.

In one embodiment, a dimming and CCT tuning lighting system may comprise a low voltage dimming input, a low voltage CCT tuning input, a dimming and CCT tuning control circuit, and multiple LED-based lighting devices. The dimming and CCT tuning control circuit receives a dimming signal from the dimming input and a CCT tuning signal from the CCT tuning input to generates at least two sets of PWM control signals. Each LED-based lighting device in the multiple LED-based lighting devices comprises at least two types of LED-based light sources and a dimming and CCT tuning controllable driver configured to receive the at least two PWM control signals and to control LED current to drive the at least two types of LED-based light sources in each LED-based lighting device of the multiple lighting devices to emit a light with a dimming level and CCT.

Because a low voltage signal attenuates significantly along a long distance from the low voltage dimming and CCT tuning inputs to multiple LED-based lighting devices, a first LED-based lighting device rather closer to the dimming and CCT tuning inputs may emit higher light intensity and higher CCT than the last LED-based lighting device. This difficulty can be overcome by mixing and converting the dimming and CCT tuning signals into at least two modulated PWM signals before sending to multiple LED-based lighting devices in a lighting zone. Thus, a dimming and CCT tuning controller may comprise a low voltage dimming input, a low voltage CCT tuning input, and a dimming and CCT tuning control circuit configured to receive the dimming signal and the CCT tuning signal from the low voltage dimming input and the low voltage CCT tuning input and to generate at least two PWM control signals to send to the dimming and CCT tuning controllable driver in each LED-based lighting device to power the at least two types of LED-based light sources accordingly. Because the dimming and CCT information is embedded in duty cycles of the modulated PWM signals after mixing and conversion, the signal strength/amplitude has no effect on the duty cycles, and thus the dimming and CCT information can be recovered. This guarantees all the lighting devices in a lighting zone can emit a light with the same dimming level and the same CCT.

In another embodiment, a dimming and CCT tuning lighting system may comprise the foregoing dimming and CCT tuning controller and multiple lighting devices in a lighting zone, taking advantages of a wide range of dimming and CCT tuning control without inconsistent CCTs due to voltage drop. Each lighting device comprises a dimming and CCT tuning controllable driver, a color filter and temperature sensor module, and at least three types of LED-based light sources. The dimming and CCT tuning controllable driver comprising a power supply section, a dimming and CCT tuning control section, and an LED driving section comprising at least three LED driving circuits. The power supply section, connecting to the AC mains, receives and converts a regular AC power into a DC power supplying the color filter and temperature sensor module, dimming and CCT tuning control section, and the at least two LED driving circuits which then drive at least three types of LED-based light sources to emit light. Based on the recovered dimming and CCT tuning signal and the sensing signals from the color filter and temperature sensor module, the dimming and CCT tuning control section generates at least three PWM control signals to send to the at least three LED driving circuits to provide driving current to drive the at least three types of LED-based light sources to emit a resultant light with a dimming level, CCT, and Duv. The lighting control according to the present disclosure may find applications in general lighting, signage, stage lighting, wall-washer, etc.

The present disclosure provides a method in the dimming and CCT tuning lighting system that comprises the dimming and CCT tuning control circuit configured for mixing and converting dimming and CCT tuning signals in a PWM signal format. The dimming and CCT tuning control circuit first reads the CCT tuning signal from the low voltage CCT tuning input and determines a ratio related to extreme CCTs of LED-based light sources used a first user signal. Then the dimming and CCT tuning control circuit reads a dimming level signal from the low voltage dimming input and determines a dimming level in response to a second user signal. The dimming and CCT tuning control circuit further integrates the ratio related to extreme CCTs of LED-based light sources with the dimming level to determine factors relevant to a target light intensity and CCT. Finally, the dimming and CCT tuning control circuit generates at least two modulated PWM signals based on the factors relevant to a target light intensity and CCT.

BRIEF DESCRIPTION OF THE DRAWINGS

The accompanying drawings are included to aid further understanding of the present disclosure, and are incorporated in and constitute a part of the present disclosure. The drawings illustrate a select number of embodiments of the present disclosure and, together with the detailed description below, serve to explain the principles of the present disclosure. It is appreciable that the drawings are not necessarily in scale as some components may be shown to be out of proportion than the size in actual implementation in order to clearly illustrate the concept of the present disclosure.

FIG. 2(A)-FIG. 2(F), is a timing diagram of a series of modulated dimming and CCT tuning signal waveforms when dimming level is set to "No Dim" according to the present disclosure.

FIG. 3(A)-FIG. 3(F), is a timing diagram of a series of modulated dimming and CCT tuning signal waveforms when dimming level is set to "Half Dim" (50% Dim) according to the present disclosure.

DETAILED DESCRIPTION OF PREFERRED EMBODIMENTS

Figure 1:
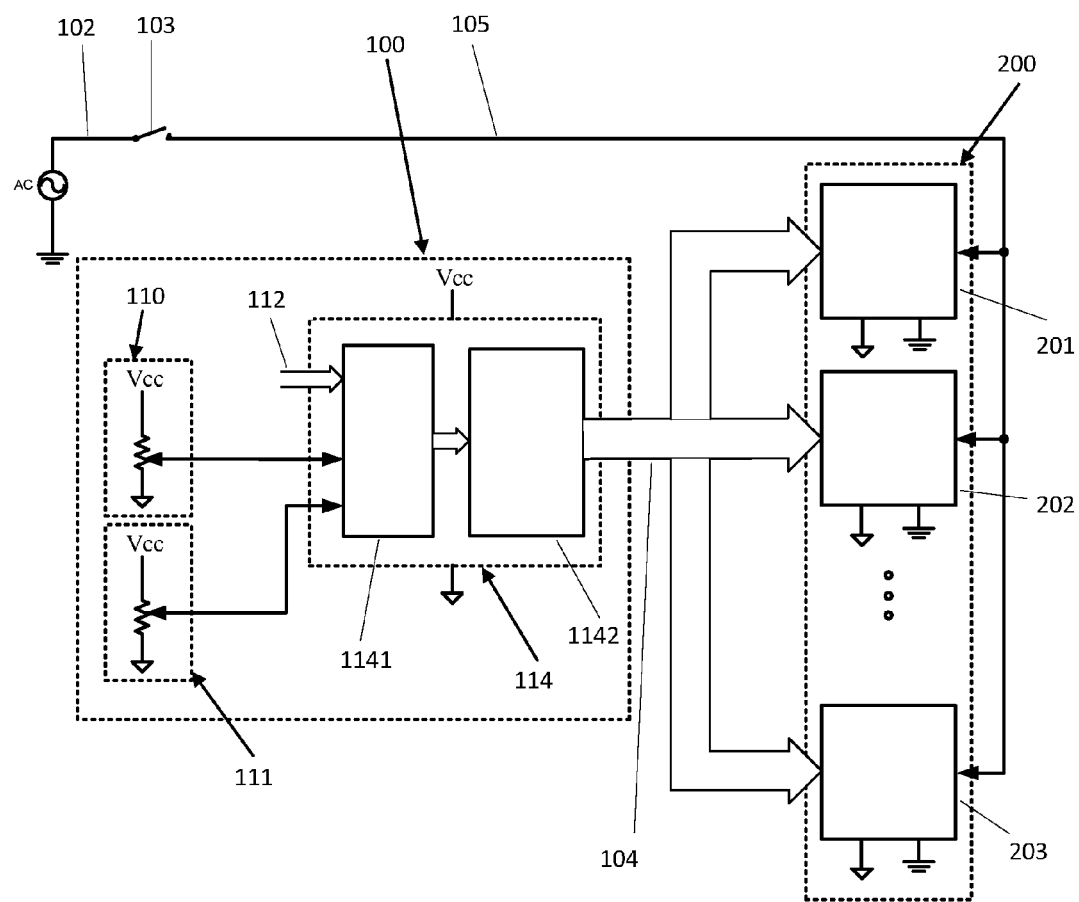
FIG. 1 is a functional block diagram of a low voltage dimming and CCT tuning controller connected with multiple lighting devices according to the present disclosure.

FIG. 1 is a functional block diagram of a low voltage dimming and CCT tuning controller 100 connected with multiple lighting devices 200 according to the present disclosure. In FIG. 1, the low voltage dimming and CCT tuning controller 100 comprises a dimming input 110, a CCT tuning input 111, a dimming and CCT tuning control circuit 114, and a set of dimming and CCT tuning signal bus 104 electrically connected to the multiple LED-based lighting devices 200 comprising LED-based lighting devices 201, 202, and 203, each comprising at least two types of LED-based light sources. The power, connected to AC mains via a power input terminal 102 and a power switch 103, is supplied to the multiple LED-based lighting devices 200 via a separate power path 105, going directly to a power supply section in each of the LED-based lighting devices 201, 202, and 203. The dimming and CCT tuning control circuit 114 comprises a microcontroller 1141, receiving dimming and CCT tuning signals from the dimming input 110 and the CCT tuning input 111 and generating at least two sets of modulated PWM signals associated with the dimming and CCT tuning signals. The dimming and CCT tuning control circuit 114 may receive ecosystem signals from photo sensors in daylight harvesting and occupancy sensors via an ecosystem port 112. The at least two sets of modulated PWM signals go through a line driver 1142 to be conditioned so that the at least two sets of modulated PWM signals can be transmitted to the multiple LED-based lighting devices 200. Although the dimming and CCT tuning control circuit 114 can be integrated in the dimming and CCT tuning inputs 110 and 111 to deal with voltage drop of low-voltage dimming and CCT tuning signals due to long range transmission, it can be integrated in each of the LED-based lighting devices 201, 202, and 203 to add more functionality. Voltage drop of the low-voltage dimming and CCT tuning signals is a serious problem for CCT tuning lighting systems because CCT or light color may be very different and noticeable between an LED-based lighting device significantly closer to the dimming and CCT tuning inputs and another LED-based lighting device far away from the dimming and CCT tuning inputs. This problem can be solved by mixing and converting the dimming and CCT tuning signals into at least two modulated PWM signals before sending to multiple lighting devices. Because the dimming and CCT information is embedded in duty cycles of the at least two modulated PWM signals after mixing and conversion, the signal strength/amplitude reduction has no effect on the duty cycles, and thus the dimming and CCT information can be recovered. This guarantees each LED-based lighting device in a specific control zone can emit a light with a dimming level and CCT. Essentially, a PWM signal controls a time-average current through an LED-based light source, and therefore, the luminance of the LED-based light source. Use of PWM signals to control the LED-based light sources is preferred over other analog luminance control methods because it prevents color-shifting that occurs with changes in drive current.

Comprising a microcontroller, the dimming and CCT tuning control circuit 114 may have built-in specific lighting settings for different times of the day and may use daylight to offset the amount of electric lighting needed to properly light a space, in order to reduce energy consumption. The energy saving can also be accomplished by using lighting ecosystems adopting photo sensors in daylight harvesting or occupancy sensors to reduce luminance of lighting devices in response to changing daylight availability. When a specific time arrives, the dimming and CCT tuning control circuit 114 automatically generates at least two sets of modulated dimming and CCT tuning PWM signals to achieve automatic luminance and CCT tuning adjustments, such as lighting with higher luminance and lower CCT at night or lighting with lower luminance and higher CCT in the daytime. In the present disclosure, the dimming and CCT tuning control circuit 114 generates the modulated dimming and CCT tuning control signals according to the dimming and the CCT tuning inputs 110 and 111. The dimming and the CCT tuning inputs 110 and 111 may be locally or remotely controlled by users. For example, the dimming and the CCT tuning inputs 110 and 111 may be replaced by a receiver to receive external dimming and CCT tuning signals from a remote transmitter. In this case, the dimming and the CCT tuning inputs 110 and 111 may be in forms other than the potentiometer/variable resistor as shown in FIG. 1, which include wireless receivers such as an infrared, a radio, an occupancy sensor, and an audio receiver. The protocols used may be Daintree, Enlighted, Bluetooth low energy, Zigbee, WiFi or EnOcean. The dimming and the CCT tuning inputs 110 and 111 may be a direct-wired receiver using protocols of 0-10V, RS232, RS485, DMX512, DALI (digital ddressable lighting interface), USB (universal serial bus) or BACnet. According to the specific type of the dimming and the CCT tuning inputs 110 and 111, users can remotely send dimming and CCT signals to the dimming and the CCT tuning inputs 110 and 111 via a corresponding user interface transmitter. Providing a second independent control signal path to light sources in a CCT tuning lighting system creates complete features enabled by digital color tuning. One alternative to low voltage dimming and CCT tuning is a direct wireless path. The approach can save time and efforts to reconfigure a lighting control zone that have many LED-based lighting devices. For example, a smart phone based commissioning tool can achieve a full CCT tuning of the LED-based light sources and even access operating status and working hours of the light sources. This two-path lighting control offers the compatibility and flexibility required to maximize the value of CCT tuning lighting system because it ensures that the LED-based lighting devices will be compatible with future developments of internet using cloud technologies, where enhanced connectivity is desired.

The present disclosure provides a method for a dimming and CCT tuning lighting system that comprises the dimming and CCT tuning controller 100 to mix and convert the dimming and CCT tuning signals into a modulated PWM signal format. The dimming and CCT tuning control circuit 114 first reads the CCT tuning signal from the low voltage CCT tuning input 111 and determines a luminance ratio between extreme CCTs of the LED-based light sources based on a first user signal. Then the dimming and CCT tuning control circuit 114 reads a dimming level signal from the low voltage dimming input 110 and determines a dimming level based on a second user signal. The dimming and CCT tuning control circuit 114 further integrates the luminance ratio between the extreme CCTs of the LED-based light sources with the dimming level to determine factors relevant to a target dimming level and CCT. Finally, the dimming and CCT tuning control circuit 114 generates at least two sets of modulated PWM signals with various duty cycles based on the factors relevant to the target dimming level and CCT.

Figure 2:
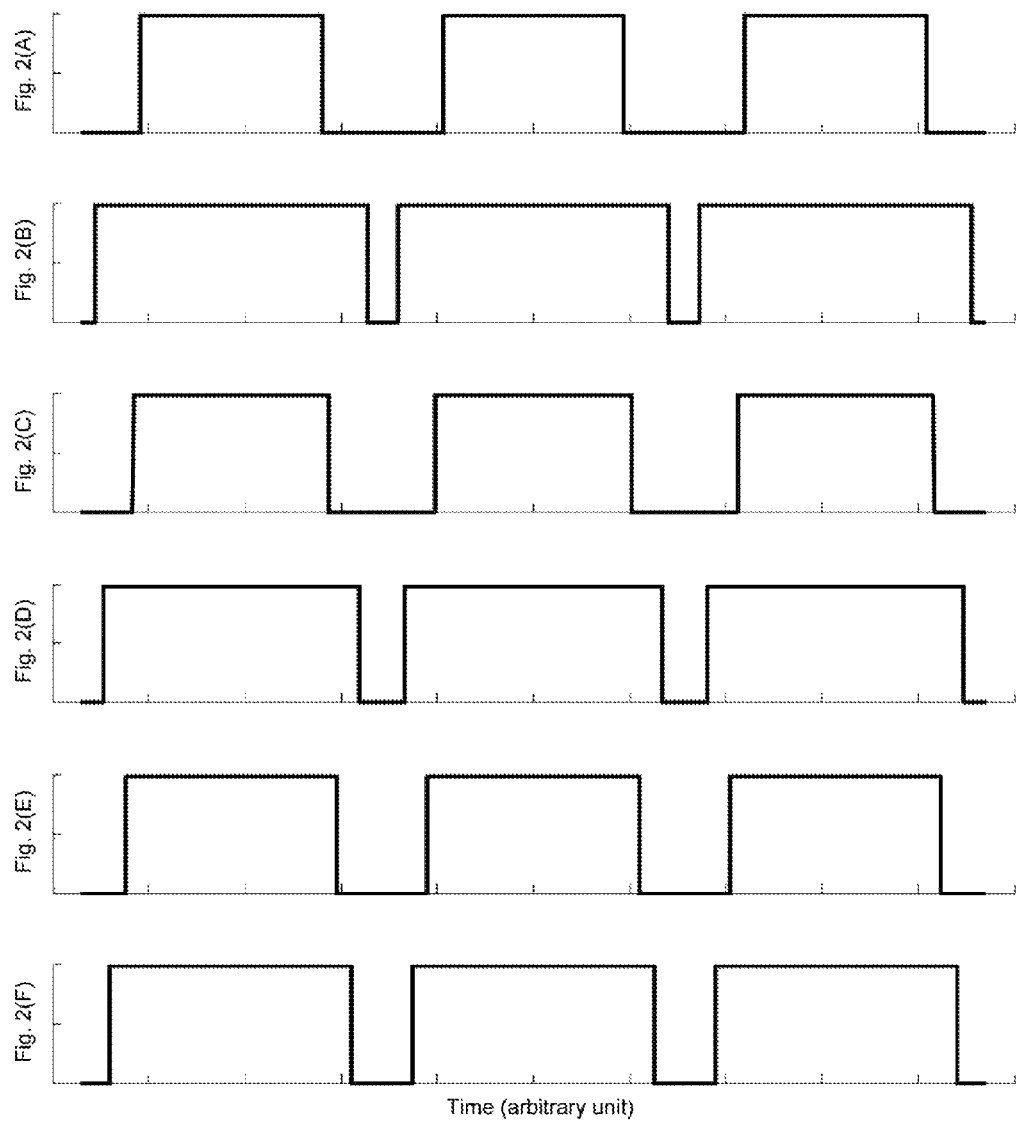
FIG. 2, which includes

FIG. 2, which includes FIG. 2(A)-FIG. 2(F), is a timing diagram of a series of modulated dimming and CCT tuning modulated PWM signal waveforms when dimming level is set to "No Dim" according to the present disclosure. Referring to FIGS. 1-2, when a user controls the low voltage dimming input to the brightest and the CCT tuning input to 20%l80%, the dimming and CCT tuning control circuit 114 first reads the CCT tuning signal voltage from the low voltage CCT tuning input 111 and determines the luminance ratio 20%/80% related to the extreme CCTs of the LED-based light sources based on the first user signal. Then the dimming and CCT tuning control circuit 114 reads the dimming level signal voltage from the low voltage dimming input 110 and determines a dimming level of 0 (No Dim). Finally the dimming and CCT tuning control circuit 114 mixes the dimming and CCT tuning signals and generates two sets of modulated PWM signal waveforms shown in FIG. 2(A) and FIG. 2(B). FIG. 2(A) and FIG. 2(B) respectively correspond to the two sets of modulated PWM signals with duty cycles of 20% and 80%, which will send to the two LED-based light sources in the LED-based lighting devices 201, 202, or 203 to emit a light with a particular CCT based on the luminance ratio for a mixture of the two LED-based light sources. FIG. 2(C) and FIG. 2(D) respectively correspond to two sets of modulated PWM signals with duty cycles of 30% and 70%. FIG. 2(E) and FIG. 2(F) respectively correspond to two sets of modulated PWM signals with duty cycles of 40% and 60%. Essentially, for each pair of the two sets of modulated PWM signals, their duty cycles should be complementary to each other with a sum of unity and the ratio of the duty cycles kept constant to guarantee that a CCT can be achieved regardless of the dimming level. The dimming and CCT tuning control circuit 114 then reads the dimming signal from the low voltage dimming input 110. If a dimming level, D, where $0 \leq D \leq 1$ is determined, then the initial duty cycles are further reduced by the dimming level D. For example, if initial duty cycles of two sets of modulated PWM signals are set to be 60% and 40%, a dimming level of 30% gives final duty cycles of 18% and 12% for the two sets of modulated PWM signals. Thus not only the ratio of supplied current to the two types of the LED light sources is preserved, the dimming level also applies to the two types of the LED-based light sources, which in turn can emit a light with an intensity and a CCT.

Figure 3:
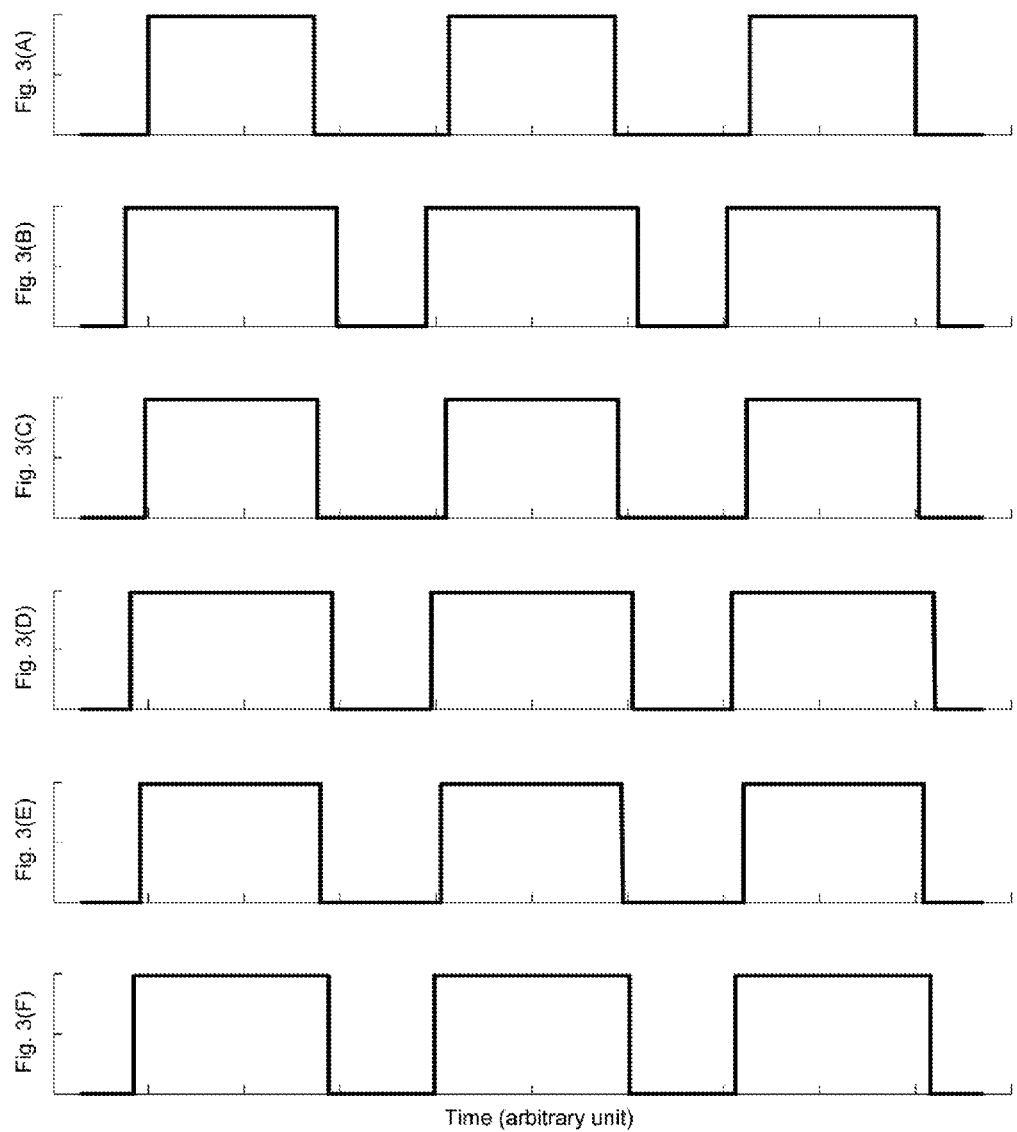
FIG. 3, which includes

FIG. 3, which includes FIG. 3(A)-FIG. 3(F), is a timing diagram of a series of modulated dimming and CCT tuning signal waveforms when dimming level is set to "Half Dim" (50% Dim) following the cases in FIG. 2 according to the present disclosure. FIG. 3(A) and FIG. 3(B) respectively correspond to two sets of modulated PWM signals with duty cycles of 10% and 40%, which will send to the two types of the LED-based light sources in each of the LED-based lighting devices 201, 202, and 203 to emit a light with the 50% dimming level and the CCT same as the case in FIG. 2, based on a light mixture of the two types of LED-based light sources. Note that because ratio of the two duty cycles of this modulated PWM signal pair is the same as that in FIG. 2(A) and FIG. 2(B), the CCT of the light mixture does not change, but the intensity of light reduces to 50%. Similarly, FIG. 3(C) and FIG. 3(D) respectively correspond to two sets of modulated PWM signals with duty cycles of 15% and 35% from original 30% and 70% in FIG. 2(C) and FIG. 2(D). FIG. 3(E) and FIG. 3(F) respectively correspond to two sets of modulated PWM signals with duty cycles of 20% and 30% from original 40% and 60% in FIG. 2(E) and FIG. 2(F).

In dimming and CCT tuning, users may adjust a dimming level and a CCT up or down. For example, an original light level is at 100% maximum luminance, and adjusting a dimming level up means making the light level less than 100% of its maximum luminance. The minimum luminance is 0%. An original light is at a CCT of 2,700K (warm white), and adjusting a CCT up means increasing the CCT of the light to be greater than 2,700K. In general lighting applications, CCT may vary from 2,700K (warm white) to 5,700K (cool white). Users can adjust CCT of a lighting device within this range to change a room atmosphere for their working or living requirements. Furthermore, since the dimming and CCT tuning controller 100 may have built-in dimming and CCT tuning commands configured for different schedules and scenes, the present disclosure may automatically generate dimming and CCT tuning control signals upon configured schedules without having to receive users' adjustment signals through the dimming and the CCT tuning inputs.

Figure 4:
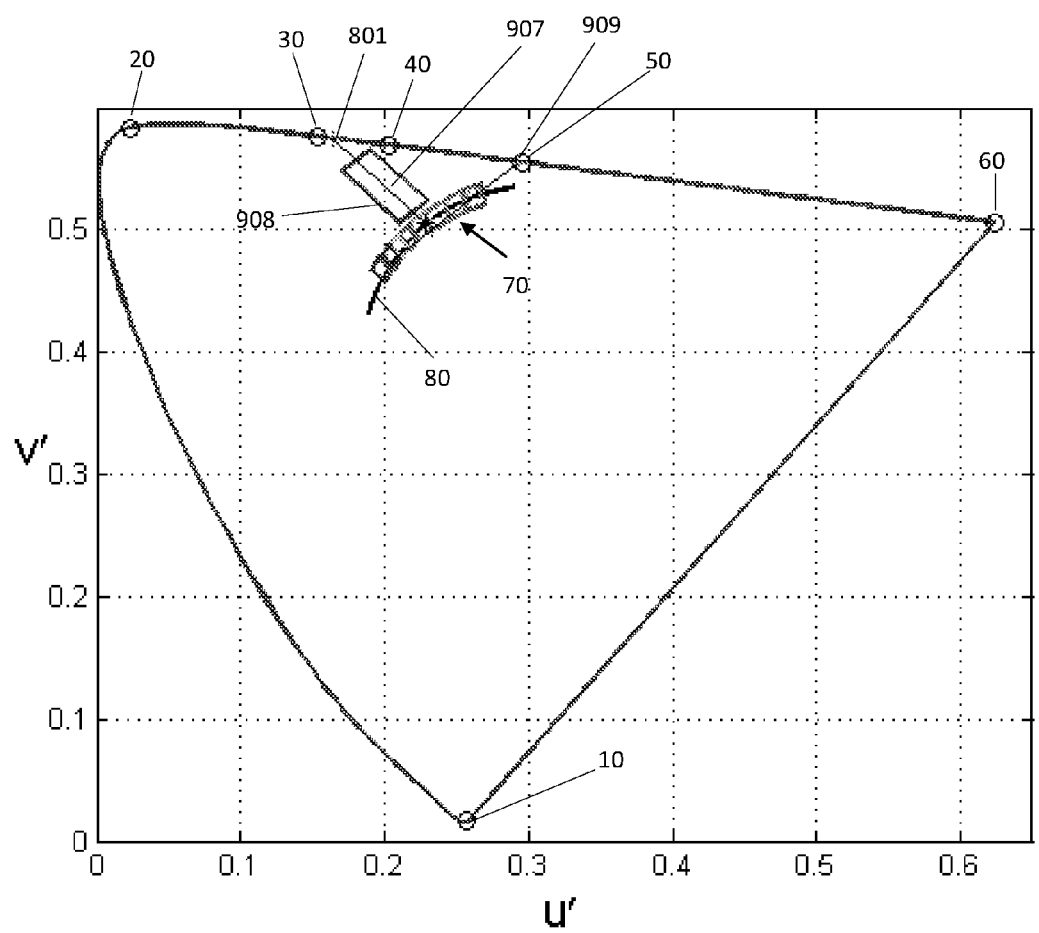
FIG. 4 is a chromaticity diagram showing linear tuning and nonlinear blackbody tuning according to the present disclosure.
Figure 5:
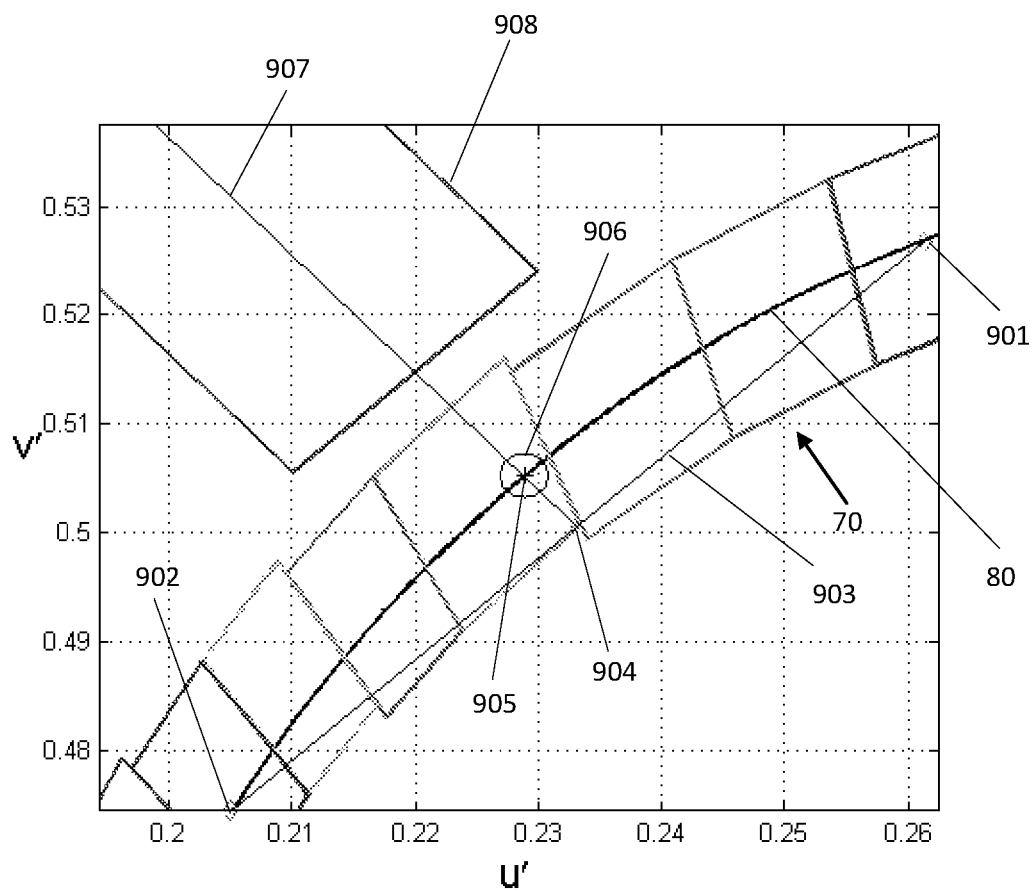
FIG. 5 is an enlarged view of the chromaticity diagram in FIG. 5 showing linear tuning and nonlinear blackbody tuning according to the present disclosure.

FIG. 4 is a CIE 1976 UCS chromaticity diagram showing linear white tuning and blackbody white tuning according to the present disclosure. FIG. 5 is an enlarged view of the chromaticity diagram in FIG. 5. In FIGS. 4-5, six saturated colors 10, 20, 30, 40, 50, and 60 at dominant wavelengths of 380, 520, 560, 570, 580, and 780 nm are respectively designated on the color gamut. The eight quadrangles 70 that specify available white color region of solid-state lighting are along the Planckian locus 80 in a CIE 1976 UCS chromaticity diagram expressed by (u', v') coordinates. Each of the eight quadrangles is defined by a range of CCT and a distance from Planckian locus on the diagram. The eight quadrangles represent eight CCT categories at nominal CCTs of 2,700, 3,000, 3,500, 4,000, 4,500, 5,000, 5,700, and 6,500 K, from top to bottom along the Planckian locus 80 in FIGS. 4 and 5. When a warm white LED at a CCT of 2,700K corresponding to a first point 901 at a coordinate (0.2613, 0.5268) mixes with a cool white LED at a CCT of 5,700K corresponding to a second point 902 at a coordinate (0.205, 0.4745), the light mixture may be at a CCT corresponding to a third point with a coordinate along the straight line 903 connecting between the first and the second points 901 and 902, depending on a luminance ratio between the two. If the luminance ratio is 1:1, the light mixture will emit a CCT with a coordinate at the midpoint 904 along the straight line 903 connecting between the first and the second points 901 and 902 shown in FIG. 6. The distance from the midpoint 904 to the closest point 905 on the Planckian locus 80 is the largest, where the Duv of the midpoint 904 may exceed 2-step MacAdam ellipse 906 which defines variance of a color whose chromaticity coordinate can be acceptably associated with a target correlated color temperature. Without additional light sources to compensate for this deviation from the Planckian locus 80 for the linear white tuning, the light mixture will never be close to Planckian locus 80 within the 2-step MacAdam ellipse 906. In other words, the average human eye may see this distinguishably different light color. However, if a third LED-based light source emits a light with a color coordinate on a line 907 that passes the midpoint 904 and perpendicular to the line 903 connecting between the first and the second color points 901 and 902, then the resultant mixture light with a proper luminance ratio of the third light and the mixture of the first and the second light can have an emission with a color coordinate within the 2-step MacAdam ellipse 906 of the closest point 905 on the Planckian locus 80. This blackbody white tuning ensures that standard deviation of color matching is within the 2-step MacAdam ellipse 906 for different lighting devices. The example of the third LED-based light source is a type of LEDs with a saturated color at a wavelength between 560 and 567 nm at a coordinate 801 or a phosphor-coated LED having yellow-green color hue and a color coordinate in a region 908 encircled by four coordinates (0.23, 0.524), (0.19, 0.5671), (0.1701, 0.5486), (0.2101, 0.5055) on CIE 1976 UCS chromaticity diagram. Furthermore, this methodology enables the use of off-Planckian phosphor-coated LEDs to improve the efficacy and performance of color tuning light sources. Use of off-Planckian such phosphor-coated LEDs can increase efficacy of tunable light sources by as much as 20% to 30%.

FIG. 5 also depicts utilizing a linear tuning of either two types of white LEDs—one warm white at 2,700K and one cool white at 5,700K or one cool white 5,700K and one LED with a saturated color 909 to form a white light in the CCT 4,000K quadrangle but out of Planckian locus. Also shown is a nonlinear blackbody tuning of such a light emission in the CCT 4,000K quadrangle and the LEDs whose emissions have a peak wavelength 801 between 560 and 565 nm, forming a white light with a CCT of 4,100K on the Planckian locus. In the same fashion, a nonlinear blackbody tuning of the light emission in the 4,000K quadrangle but out of 2-step-MacAdam ellipse and the phosphor-coated LEDs whose coordinate of the emissions located in the region 908 (perceived as yellow-green) can form a white light exactly on the Planckian locus in the CIE chromaticity diagram. Both nonlinear blackbody tuning result in a better CRI, Duv, and color consistency.

Figure 6:
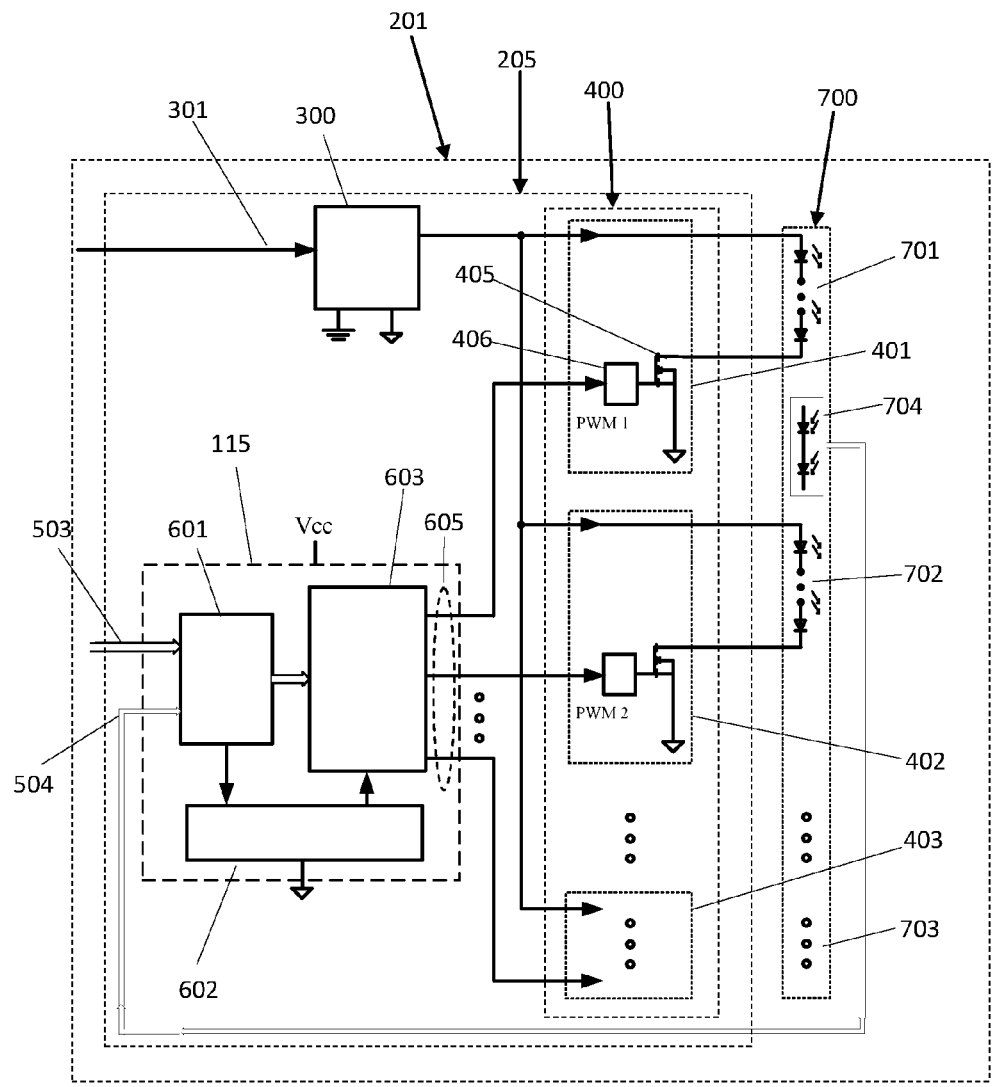
FIG. 6 is a functional block diagram of a dimmable and CCT tunable lighting device according to the present disclosure.

FIG. 6 is a functional block diagram of a dimmable and CCT tunable lighting device 201 according to the present disclosure. In FIG. 6, the lighting device 201 comprises an LED module 700 and a dimming and CCT tuning controllable driver 205 comprising a power supply section 300, an LED driving circuit section 400, and a dimming and CCT tuning control section 115. The LED driving circuit section 400 comprises at least two LED driving circuits 401 and 402 respectively connected to at least two types of LED-based light sources 701 and 702 in the LED module 700. The at least two types of LED-based light sources 701 and 702 emit two different white light at the two extreme CCTs; different wavelengths with different saturated colors such as red, green, and blue; or combinations such as one white light at a specific CCT and the other one with a saturated colors of red, green, or blue. In one embodiment, a first type of the at least two types of LED-based light sources may be a white LED having a CCT at 6,200±300 K whereas a second type may have a saturated color at a peak wavelength from 583 to 586 nm to ensure that a resultant light can be in the Planckian locus of the CIE chromaticity diagram. In another embodiment, the first type of the at least two types of LED-based light sources is a white LED having a CCT at 5,700±300 K whereas the second type is a white LED having a CCT at 2,700±300 K. In color mixing applications, LED chips of the at least two types of LED-based light sources 701 and 702 should be mounted in a way that they interlace or encircle each other on an LED printed circuit board (not shown) to ensure color uniformity in the resultant light. On the LED module 700 mounted a module 704 comprising color filters and temperature sensors to monitor the spectrum and lumen depreciation of the light mixture and junction temperature on the LED printed circuit board. The monitored signals are then fed back into the dimming and CCT tuning control section 115 to calculate an optimal operating driving current for a third type of LED-based light source to compensate possible CCT deviations for every color point in the tuning range.

In FIG. 6, the power input terminals 301 in the power supply section 300, connected to the AC power to convert to a DC power supplying the at least two LED driving circuits 401 and 402 which also receive at least two sets of modulated PWM signals from dimming and CCT tuning control section 115 to provide two sets of driving current respectively powering the two types of LED-based light sources 701 and 702. The power supply section 300 can be any switch mode power supplies with multiple regulated voltages comprising a low voltage source. The low voltage source in each LED-based lighting device can also provide the power needed for additional sensors such as occupancy sensors, photo sensors in daylight harvesting, and indoor positioning. The LED driving circuit 401 is configured with an internal MOSFET switch 405 to drive the LED-based light source 701. In the LED driving circuit 401, a PWM port (PWM1) is connected to one of PWM output terminal ports 605 of the dimming and CCT tuning control section 115 to receive a PWM control signal from the one of PWM output terminal ports 605 with a specific duty cycle to control supplied current to the LED-based light source 701 to emit a light brighter or dimmer according to the duty cycle of the modulated PWM signal. The LED driving circuits 402 and 403 serve the same functions as the LED driving circuits 401, except that their modulated PWM signals have another specific duty cycles to control the LED-based light sources 702 and 703.

For color consistency, the in-line spectral capture enables a color point match of less than 2-step MacAdam ellipse across CCT tuning range. The use of color filters and temperature sensors ensures in-line spectral monitoring based on combined LED, driver, and diffusing element over a range of CCT, electric current settings, and thermal status. For example, when the dimming and CCT tuning control section 115 determines that Duv is out of Mac Adam ellipse associated with a specific CCT along Planckian locus of the CIE chromaticity diagram, it may generate a third set of modulated PWM signal to drive the third type of LED-based light source 703 in the LED module 700. For another example, when the dimming and CCT tuning control section 115 determines that intensity of one of the at least two types of LED-based light sources 701 and 702 is lower than the original preset value due to lumen depreciation, it may modify the two sets of modulated PWM signals to drive the first type or the second type of the LED-based light sources 701 and 702 in the LED module 700 so as to maintain high color quality such as CRI, R9 and Duv over the full CCT tuning range. Although it is desirable to control a CCT of the dimming and CCT tuning lighting system within 2-step MacAdam ellipse along the Planckian locus in the CIE chromaticity diagram, a tolerance of 7-step MacAdam ellipse may be acceptable in some cases. Also note that the color filters and the temperature sensors in the module 704 do not have to be placed together to monitor the designated parameters.

In FIG. 6, the dimming and CCT tuning control section 115 comprises an input terminal 503 connected to the dimming and CCT tuning controller 100 in FIG. 1, a feedback input 504 connected to the additional module 704 on the LED module 700 to monitor the spectrum and lumen depreciation of the light mixture and junction temperature in the LED PCB, and the output terminal ports 605 connected to the LED driving circuit section 400. The dimming and CCT tuning control section 115 comprises an analog-to-digital converter (ADC) 601 to convert analog data into digital ones, a flash memory 602 to store the dimming and CCT tuning signal portion digitized by ADC 601, a processor 603 to generate at least two sets of PWM control signals according to the dimming and CCT tuning signal and to send to the at least two LED driving circuits 401 and 402 so that the LED driving circuit section 400 can drive the at least two types of the LED-based light sources 701 and 702 to emit a light with a luminance and a CCT. Although the dimming and CCT tuning control section 115 is configured to receive the modulated PWM signals related to dimming and CCT tuning signals from the dimming and CCT tuning controller 100, dimming and CCT tuning signals in their original low voltage signal formats are acceptable, taking advantage of use of the processor 603. This feature increases flexibility and compatibility for connectivity. Furthermore, the flash memory 602 in the dimming and CCT tuning control circuit 600 may also store a lighting status of the at least two types of the LED-based light sources 701 and 702 and even an address of the lighting device 201. Once receiving dimming and CCT tuning signals, the dimming and CCT tuning control section 115 increases or decreases the duty cycles of the modulated PWM signals coupled to the PWM inputs of the at least two LED driving circuits 401 and 402 such that the two sets of driving current provided to the two types of LED-based light sources 701 and 702 can change accordingly. Based on the duty cycles of the currents and their ratio, a resultant light emitting from the two types of the LED-based light sources 701 and 702 can mix to exhibit a luminance or a CCT.

In FIG. 6, the LED-based lighting device 201 can be down lights, par lights, A19 lights, linear tubes, troffer luminaires, panel lights, and the combination. The lighting device can have its compatible socket adapter such as E27, E26, MR16, GU10, GU24, G13, etc. or just wire connections.

In view of the above, highlight of a number of example implementations and select features thereof is provided below.

A dimming and CCT tuning controller may include a low voltage dimming input, a low voltage CCT tuning input, and a dimming and CCT tuning control circuit configured to receive and to mix a dimming signal and a CCT tuning signal from the low voltage dimming input and the low voltage CCT tuning input and to generate at least two PWM control signals. In response to either the dimming signal or the CCT tuning signal from either the low voltage dimming input or the low voltage CCT tuning input, the dimming and CCT tuning control circuit may send the at least two PWM control signals to at least two LED drivers in one or more lighting devices to power at least two types of LED-based light sources therein accordingly in an event that the dimming and CCT tuning control circuit is coupled to the at least two LED drivers in the one or more lighting devices.

In some implementations, the low voltage dimming input may include a 0-10 V controller.

In some implementations, the low voltage CCT tuning input may include a 0-10 V controller.

In some implementations, at least one of the low voltage dimming input and the low voltage CCT tuning input may include a type of potentiometer or a variable resistor.

In some implementations, at least one of the low voltage dimming input and the low voltage CCT tuning input may include a wireless receiver. In some implementations, the wireless receiver may include a radio receiver, an infrared receiver, an occupancy sensor, an audio receiver, a photo sensor of daylight harvesting, or an internet-based receiver controllable by a smart phone.

In some implementations, at least one of the low voltage dimming input and the low voltage CCT tuning input may include a hardwired receiver. In some implementations, the hardwired receiver may operate based on a protocol of RS232, RS485, DMX512, USB, or DALI.

A dimming and CCT tuning lighting system may include a low voltage dimming input, a low voltage CCT tuning input, and at least one LED-based lighting device. The at least one LED-based lighting device may include at least two types of LED-based light sources and a dimming and CCT tuning controllable driver. The dimming and CCT tuning controllable driver may include a power supply section, a dimming and CCT tuning control section, and an LED driving section. The power supply section may be configured to receive an alternating current (AC) power to generate a direct current (DC) power. The dimming and CCT tuning control section may be configured to receive and to mix a dimming signal and a CCT tuning signal from the low voltage dimming input and the low voltage CCT tuning input and to generate at least two PWM control signals. The LED driving section may be connected to the power supply section and configured to receive the DC power and the at least two PWM control signals to drive the at least two types of LED-based light sources to emit a light with a dimming level and a CCT.

In some implementations, each of the at least two types of the LED-based light sources may include an LED, an organic LED (OLED), or a polymer LED (PLED).

In some implementations, the dimming and CCT tuning control section may include a flash memory configured to store lighting status and an address of each LED-based lighting device of the at least one LED-based lighting device.

In some implementations, the at least two types of the LED-based light sources may include a first type of a white LED having a CCT at 5,700±300 K and a second type of an LED having a saturated color at a peak wavelength from 575 to 583 nm.

In some implementations, the at least two types of LED-based light sources may include a first type of a white LED having a CCT at 5,700±300 K and a second type of a white LED having a CCT at 2,700±300 K.

In some implementations, the at least two types of LED-based light sources may include a red LED, a green LED, and a blue LED.

In some implementations, the at least one LED-based lighting device may further include a color filter and temperature sensor module configured to monitor light spectrum and junction temperatures of the LED-based light sources.

In some implementations, the at least one LED-based lighting device may further include a third type of LED-based light source configured to control a CCT of the dimming and CCT tuning lighting system within 7-step MacAdam ellipse along the Planckian locus in CIE chromaticity diagram.

In some implementations, the third type of LED-based light source may have a saturated color at a peak wavelength from 560 to 567 nm.

In some implementations, the third type of LED-based light source may include a phosphor-coated LED having yellow-green color hue and a color coordinate in a region encircled by four coordinates (0.23, 0.524), (0.19, 0.5671), (0.1701, 0.5486), (0.2101, 0.5055) on CIE 1976 UCS chromaticity diagram.

A dimming and CCT tuning lighting system may include a low voltage dimming input, a low voltage CCT tuning input, a dimming and CCT tuning control circuit, and at least one LED-based lighting device. The dimming and CCT tuning control circuit may be configured to receive and to mix a dimming signal and a CCT tuning input signal from the low voltage dimming input and the low voltage CCT tuning input and to generate at least two PWM control signals. The at least one LED-based lighting device may include at least two types of LED-based light sources and a dimming and CCT tuning controllable driver. The dimming and CCT tuning controllable driver may include a power supply section and an LED driving section. The power supply section may be configured to receive an AC power to generate a DC power. The LED driving section may be connected to the power supply section and configured to receive the DC power and the at least two PWM control signals from the dimming and CCT tuning control circuit to drive the at least two types of LED-based light sources to emit a light with a dimming level and a CCT.

In some implementations, each of the at least two types of LED-based light sources may include an LED, an OLED, or a PLED.

In some implementations, the dimming and CCT tuning control circuit may include a flash memory configured to store lighting status and an address of each lighting device of the at least one lighting device.

In some implementations, the at least two types of LED-based light sources may include a first type of a white LED having a CCT at 5,700±300 K and a second type of an LED having a saturated color at a peak wavelength from 575 to 583 nm.

In some implementations, the at least two types of LED-based light sources may include a first type of a white LED having a CCT at 5,700±300 K and a second type of a white LED having a CCT at 2,700±300 K.

In some implementations, the at least two types of LED-based light sources may include a red LED, a green LED, and a blue LED.

A method implemented in a dimming and CCT tuning lighting system for controlling driving currents to light-emitting diode (LED)-based light sources in multiple lighting devices may involve a number of operations. The method may involve determining a ratio related to extreme CCTs of the LED-based light sources from a CCT tuning input based on a first user signal. The method may also involve determining a dimming level from a dimming input based on a second user signal. The method may still involve integrating the ratio related to the extreme CCTs of the LED-based light sources with the dimming level to obtain factors relevant to a target dimming level and CCT. The method may further involve generating PWM signals based on the factors relevant to the target dimming level and CCT. The method may additionally involve controlling driving currents to the LED-based light sources in the multiple lighting devices using the PWM signals.

Whereas preferred embodiments of the present disclosure have been shown and described, it will be realized that alterations, modifications, and improvements may be made thereto without departing from the scope of the following claims. Accordingly, the foregoing description and attached drawings are by way of example only, and are not intended to be limiting.

What is claimed is:

1. A dimming and correlated color temperature (CCT) tuning lighting system, comprising:
   a low voltage dimming input;
   a low voltage CCT tuning input; and
   at least one light-emitting diode (LED)-based lighting device, comprising:
      at least two types of LED-based light sources; and
      a dimming and CCT tuning controllable driver, comprising:
         a power supply section configured to receive an alternating current (AC) power to generate a direct current (DC) power;
         a dimming and CCT tuning control section configured to receive and to mix a dimming signal and a CCT tuning signal from the low voltage dimming input and the low voltage CCT tuning input and to generate at least two pulse-width modulated (PWM) control signals; and
         an LED driving section connected to the power supply section and configured to receive the DC power and the at least two PWM control signals to drive the at least two type of LED-based light sources to emit a light with a dimming level and a CCT,
   wherein, in response to the dimming signal and CCT tuning signal from the low voltage dimming input and the low voltage CCT tuning input, the dimming and CCT tuning control section performing operations comprising:
      determining a ratio related to extreme CCTs of the LED-based light sources from the low voltage CCT tuning input and the dimming level from the low voltage dimming input;
      integrating the ratio related to the extreme CCTs of the LED-based light sources with the dimming level to obtain factors relevant to a target dimming level and CCT; and
      generating PWM signals based on the factors relevant to the target dimming level and CCT.

2. The dimming and CCT tuning lighting system of claim 1, wherein each of the at least two types of the LED-based light sources comprises an LED, an organic LED (OLED), or a polymer LED (PLED).

3. The dimming and CCT tuning lighting system of claim 1, wherein the dimming and CCT tuning control section comprises a flash memory configured to store lighting status and an address of each LED-based lighting device of the at least one LED-based lighting device.

4. The dimming and CCT tuning lighting system of claim 1, wherein the at least two types of the LED-based light sources comprise a first type of a white LED having a CCT at 5,700±300 K and a second type of an LED having a saturated color at a peak wavelength from 575 to 583 nm.

5. The dimming and CCT tuning lighting system of claim 1, wherein the at least two types of LED-based light sources comprise a first type of a white LED having a CCT at 5,700±300 K and a second type of a white LED having a CCT at 2,700±300 K.

6. The dimming and CCT tuning lighting system of claim 1, wherein the at least two types of LED-based light sources comprise a red LED, a green LED, and a blue LED.

7. The dimming and CCT tuning lighting system of claim 1, wherein the at least one LED-based lighting device further comprises a color filter and temperature sensor module configured to monitor light spectrum and junction temperatures of the LED-based light sources.

8. The dimming and CCT tuning lighting system of claim 1, wherein the at least one LED-based lighting device further comprises a third type of LED-based light source configured to control a CCT of the dimming and CCT tuning lighting system within 7-step MacAdam ellipse along the Planckian locus in CIE chromaticity diagram.

9. The dimming and CCT tuning lighting system of claim 8, wherein the third type of LED-based light source has a saturated color at a peak wavelength from 560 to 567 nm.

10. The dimming and CCT tuning lighting system of claim 8, wherein the third type of LED-based light source comprises a phosphor-coated LED having yellow-green color hue and a color coordinate in a region encircled by four coordinates (0.23, 0.524), (0.19, 0.5671), (0.1701, 0.5486), (0.2101, 0.5055) on CIE 1976 UCS chromaticity diagram.

11. The dimming and CCT tuning lighting system of claim 1, wherein the low voltage dimming input comprises a 0-10 V controller.

12. The dimming and CCT tuning lighting system of claim 1, wherein the low voltage CCT tuning input comprises a 0-10 V controller.

13. The dimming and CCT tuning lighting system of claim 1, wherein at least one of the low voltage dimming input and the low voltage CCT tuning input comprises a type of potentiometer or a variable resistor.

14. The dimming and CCT tuning lighting system of claim 1, wherein at least one of the low voltage dimming input and the low voltage CCT tuning input comprises a wireless receiver.

15. The dimming and CCT tuning lighting system of claim 14, wherein the wireless receiver comprises a radio receiver, an infrared receiver, an occupancy sensor, an audio receiver, a photo sensor of daylight harvesting, or an internet-based receiver controllable by a smart phone.

16. The dimming and CCT tuning lighting system of claim 1, wherein at least one of the low voltage dimming input and the low voltage CCT tuning input comprises a hardwired receiver.

17. The dimming and CCT tuning lighting system of claim 16, wherein the hardwired receiver operates based on a protocol of RS232, RS485, DMX512, USB, or DALI.

18. A dimming and correlated color temperature (CCT) tuning lighting system, comprising:
   a low voltage dimming input;
   a low voltage CCT tuning input;
   a dimming and CCT tuning control circuit configured to receive and to mix a dimming signal and a CCT tuning signal from the low voltage dimming input and the low voltage CCT tuning input and to generate at least two pulse-width modulated (PWM) control signals; and
   at least one LED-based lighting device, comprising:
      at least two types of LED-based light sources; and
      a dimming and CCT tuning controllable driver, comprising:
         a power supply section configured to receive an alternating current (AC) power to generate a direct current (DC) power; and
         an LED driving section connected to the power supply section and configured to receive the DC power and the at least two PWM control signals from the dimming and CCT tuning control circuit to drive the at least two types of LED-based light sources to emit a light with a dimming level and a CCT, wherein, in response to the dimming signal and CCT tuning signal from the low voltage dimming input and the low voltage CCT tuning input, the dimming and CCT tuning control section performing operations comprising:

determining a ratio related to extreme CCTs of the LED-based light sources from the low voltage CCT tuning input and the dimming level from the low voltage dimming input;

integrating the ratio related to the extreme CCTs of the LED-based light sources with the dimming level to obtain factors relevant to a target dimming level and CCT; and generating PWM signals based on the factors relevant to the target dimming level and CCT.

19. The dimming and CCT tuning lighting system of claim 18, wherein each of the at least two types of LED-based light sources comprises an LED, an organic LED (OLED), or a polymer LED (PLED).

20. The dimming and CCT tuning lighting system of claim 18, wherein the dimming and CCT tuning control circuit comprises a flash memory configured to store lighting status and an address of each LED-based lighting device of the at least one LED-based lighting device.

21. The dimming and CCT tuning lighting system of claim 18, wherein the at least two types of LED-based light sources comprise a first type of a white LED having a CCT at 5,700±300 K and a second type of an LED having a saturated color at a peak wavelength from 575 to 583 nm.

22. The dimming and CCT tuning system of claim 18, wherein the at least two types of LED-based light sources comprise a first type of a white LED having a CCT at 5,700±300 K and a second type of a white LED having a CCT at 2,700±300 K.

23. The dimming and CCT tuning system of claim 18, wherein the at least two types of LED-based light sources comprise a red LED, a green LED, and a blue LED.

24. The dimming and CCT tuning lighting system of claim 18, wherein the low voltage dimming input comprises a 0-10 V controller.

25. The dimming and CCT tuning lighting system of claim 18, wherein the low voltage CCT tuning input comprises a 0-10 V controller.

26. The dimming and CCT tuning lighting system of claim 18, wherein at least one of the low voltage dimming input and the low voltage CCT tuning input comprises a type of potentiometer or a variable resistor.

27. The dimming and CCT tuning lighting system of claim 18, wherein at least one of the low voltage dimming input and the low voltage CCT tuning input comprises a wireless receiver.

28. The dimming and CCT tuning lighting system of claim 27, wherein the wireless receiver comprises a radio receiver, an infrared receiver, an occupancy sensor, an audio receiver, a photo sensor of daylight harvesting, or an internet-based receiver controllable by a smart phone.

29. The dimming and CCT tuning lighting system of claim 18, wherein at least one of the low voltage dimming input and the low voltage CCT tuning input comprises a hardwired receiver.

30. The dimming and CCT tuning lighting system of claim 29, wherein the hardwired receiver operates based on a protocol of RS232, RS485, DMX512, USB, or DALI.

* * * * *